United States Patent [19]

Kitagawa et al.

[11] Patent Number: 4,956,001

[45] Date of Patent: Sep. 11, 1990

[54] METHOD AND APPARATUS FOR BENDING AND ANNEALING GLASS SHEETS TO BE LAMINATED

[75] Inventors: Katsuhiko Kitagawa; Takeshi Maeda, both of Matsusaka, Japan

[73] Assignee: Central Glass Company, Limited, Ube, Japan

[21] Appl. No.: 424,125

[22] Filed: Oct. 19, 1989

[30] Foreign Application Priority Data

Oct. 21, 1988 [JP] Japan .......................... 63-137610[U]
Oct. 31, 1988 [JP] Japan ............................... 63-275451

[51] Int. Cl.$^5$ ............................................ C03B 23/02
[52] U.S. Cl. ....................................... 65/107; 65/104; 65/287; 65/288
[58] Field of Search .......... 65/104, 106, 107, 288-291, 65/351, 361

[56] References Cited

U.S. PATENT DOCUMENTS

| | | | |
|---|---|---|---|
| 3,307,930 | 3/1967 | Stevens et al. | 65/290 X |
| 4,738,704 | 4/1988 | Vanaschen et al. | 65/106 |
| 4,775,402 | 10/1988 | Letemps et al. | 65/107 |
| 4,838,920 | 6/1989 | Gonzales et al. | 65/104 |

FOREIGN PATENT DOCUMENTS 62-283834 12/1987 Japan .
63-190730 8/1988 Japan .

Primary Examiner—Robert L. Lindsay
Attorney, Agent, or Firm—Fleit, Jacobson, Cohn, Price, Holman & Stern

[57] ABSTRACT

The invention relates to the bending and annealing of two, or more than two, glass sheets to be united into a curved and laminated glass member such as an automobile windshield. In a shaping furnace a heated first glass sheet is bent into a curved glass sheet and layed on a ring-like holder. Then the holder is moved into and kept in a high-temperature section of an auxiliary furnace which is movably disposed adjacent the shaping furnace, and a second glass sheet is bent in the shaping furnace. Then the holder is moved into the shaping furnace to lay the second curved glass sheet on the first curved glass sheet, while the auxiliary furnace is moved to bring its low-temperature section to a position adjacent to the exit of the shaping furnace. Then the holder on which the two curved glass sheets are lying as a stack is moved into the low-temperature section to simultaneously anneal the two curved glass sheets. During the annealing operation the bending of another glass sheet can be performed in the shaping furnace.

12 Claims, 3 Drawing Sheets

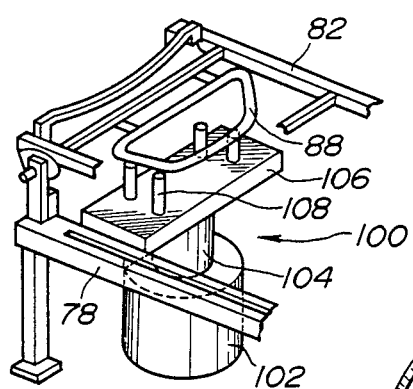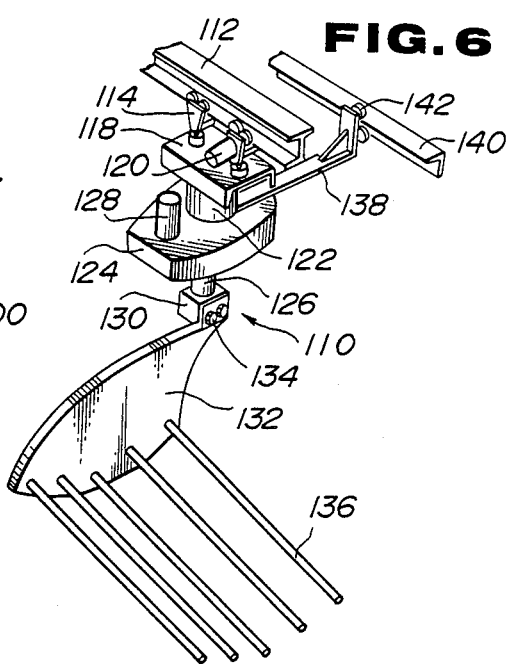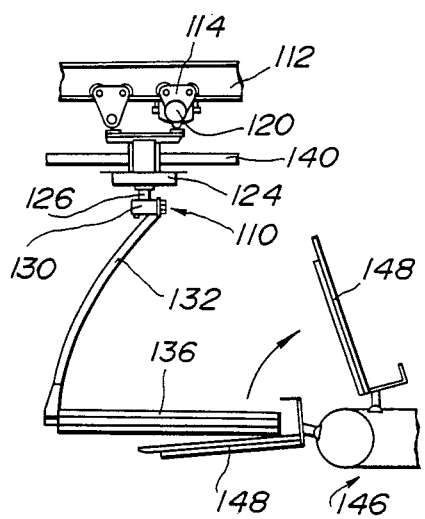

METHOD AND APPARATUS FOR BENDING AND ANNEALING GLASS SHEETS TO BE LAMINATED

BACKGROUND OF THE INVENTION

This invention relates to a method of consecutively bending at least two glass sheets to be united into a curved and laminated glass sheet such as an automobile windshield and annealing the bent glass sheets and an apparatus for the bending and annealing method.

Many of recent automobiles have a curved windshield made of laminated glass, and further there is a trend toward the use of a curved and laminated glass pane in the rear window.

Glass sheets for a curved windshield of laminated glass are individually bent to a curved shape as specified at a temperature near the glass softening point and then annealed. The fundamental object of the annealing is for relieving the bent glass sheets from internal strains, and it is also intended not to strengthen the glass sheets so that a human head colliding against the windshield may not receive a very dangerous shock. Besides, the annealing prevents the glass of the windshield from breaking into very small pieces and obstructing the driver's field of view in case of an accident.

In annealing two (or more than two) curved glass sheets to be united into a laminated glass member such as an automobile windshield, it is desirable to place one glass sheet on the other in order that the curvature of the former glass sheet may accurately conform to that of the latter glass sheet. In this connection, JP-A No. 63-190730 shows a process comprising the steps of bending two glass sheets individually and consecutively, placing each of the resultant curved glass sheets on a ring-like holder and annealing the glass sheets on the respective holders, thereafter taking one of the curved glass sheets off the ring-like holder and placing that glass sheet upon the curved glass sheet on the other ring-like holder and subjecting the two curved glass sheets in the stacked state to a shape redressing heat treatment. For this process the annealing furnace needs to have a large capacity to accomode at least two curved glass sheets each placed on the ring-like holder, and a complicated system is needed for the transfer of the ring-like holders from the glass sheet bending station to the annealing furnace, then to the shape redressing heat treatment station and again to the bending station.

JP-A No. 62-283834 shows a process comprising the steps of bending a first glass sheet and placing the resultant curved glass sheet on a ring-like holder mounted on a carriage, bending a second glass sheet while maintaining the first curved glass sheet nearly at the bending temperature and placing the second curved glass sheet upon the first curved glass sheet on the ring-like holder, transferring the carriage carrying thereon the ring-like holder and the curved glass sheets to an annealing furnace, transferring the annealed glass sheets to a next station and returning the carriage to the bending station. In this method a matter for consideration is the apparatus for the cycling transfer of the carriage, and problems to be solved include a considerable amount of thermal energy consumed in reheating the carriage and deformation of the repeatedly heated and cooled carriage.

SUMMARY OF THE INVENTION

It is an object of the present invention to provide a method of bending glass sheets to be united into a curved and laminated glass member such as an automobile windshield and annealing the bent glass sheets in a state placed one upon another, in which method the annealing is accomplished by simplified operations with good productivity and reduced consumption of energy.

It is another object of the invention to provide an apparatus for performing the method according to the invention.

The present invention provides a method of consecutively and similarly bending at least two glass sheets to be united into a curved and laminated glass member and annealing the curved glass sheets obtained by bending, the method comprising the steps of (a) heating a first glass sheet to a shaping temperature suitable for bending of the glass sheet, (b) in a shaping zone of a furnace bending the heated first glass sheet into a first curved glass sheet and holding the first curved glass sheet generally horizontally in a lifted position, (c) bringing a ring-like holder into the shaping zone and laying the first curved glass sheet on the holder, (d) transferring the holder with the first curved glass sheet laid thereon from the shaping zone into a high-temperature section of an auxiliary furnace which is located adjacent to the shaping furnace, the high-temperature section being maintained at a predetermined temperature close to the shaping temperature, (e) heating a second glass sheet to the shaping temperature, (f) in the shaping zone bending the second glass sheet into a second curved glass sheet while the first curved glass sheet on the ring-like holder is kept in the high-temperature section of the auxiliary furnace and holding the second curved glass sheet generally horizontally in a lifted position, (g) bringing the ring-like holder with the first curved glass sheet laid thereon into the shaping zone and laying the second curved glass sheet on the first curved glass sheet lying on the holder, (h) transferring the holder on which the curved glass sheets to be united into the laminated glass member are lying from the shaping zone into a low-temperature section of the auxiliary furnace, and (i) annealing the curved glass sheets lying on the holder in the low-temperature section of the auxiliary furnace.

In the practice of the above method the auxiliary furnace is preferably a movable furnace, and the auxiliary furnace is moved such that the high-temperature section is in a position adjacent to the shaping zone of the shaping furnace at the start of the step (d) and such that the low-temperature section is in that position at the start of the step (h).

For the above method an apparatus according to the invention comprises a furnace having a shaping zone, shaping means for bending each of the glass sheets into a curved glass sheet and holding the curved glass sheet generally horizontally in a lifted position in the shaping zone, an auxiliary furnace which is disposed adjacent to the shaping furnace and is partitioned into a high-temperature section where a predetermined temperature close to the temperature in the shaping zone can be maintained and a low-temperature section for annealing the curved glass sheets, a shift means for moving the auxiliary furnace such that either of the high-temperature section and the low-temperature section can be brought to a position adjacent to the shaping zone of the shaping furnace at a desired time, a ring-like holder which is shaped such that the curved glass sheets can be laid thereon generally horizontally, a movable frame supporting thereon the ring-like holder, and carriage means for horizontally and linearly moving the frame so as to introduce the ring-like holder into the auxiliary furnace and further into the shaping zone and withdraw the holder from the shaping zone into the auxiliary furnace and then from the auxiliary furnace.

Preferably the shaping means in this apparatus comprises a bending mold which can be brought into and withdrawn from the shaping zone and a vacuum holder which is vertically movably disposed in an upper section of the shaping zone and has an apertured shaping surface as a bottom surface. A heated glass sheet is bent by attracting the glass sheet to the shaping surface of the vacuum holder and lifting the holder, then introducing the bending mold into the shaping zone and lowering the vacuum holder to press the glass sheet in contact with the shaping surface against the mold, and lifting the vacuum holder with the curved glass sheet in contact with the shaping surface.

By the method and apparatus according to the invention the bending of the first glass sheet is performed while the ring-like holder is waiting in the high-temperature section of the auxiliary furnace, and the bending of the second glass sheet is performed while the first curved glass sheet lying on the ring-like holder is kept in the high-temperature section. It suffices to use a single set of the movable frame on which the ring-like holder is mounted and the carriage means to move the frame, and the path of the ring-like holder transfer is very short by virtue of the disposition of the movable auxiliary furnace partitioned into the high-temperature and low-temperature sections adjacent to the shaping furnace. The apparatus can be made compact and serves the purpose of saving energy, and the consecutive bending and annealing of glass sheets can be carried out with good productivity, and the curved glass sheets annealed simultaneously in the state of a stack are accurately conforming to each other in curvature.

BRIEF DESCRIPTION OF THE DRAWINGS

FIG. 5 shows, in a perspective view, a mechanism to lift glass sheets bent, annealed and laid on a ring-like holder shown in FIG. 3;

FIG. 6 is a perspective view of a mechanism to take up and transport the glass sheets lifted by the mechanism of FIG. 5; and FIG. 7 is a side elevational view of the mechanism of FIG. 6 in a position where the glass sheets are transferred to a peg conveyor.

DESCRIPTION OF THE PREFERRED EMBODIMENTS

Figure 1:
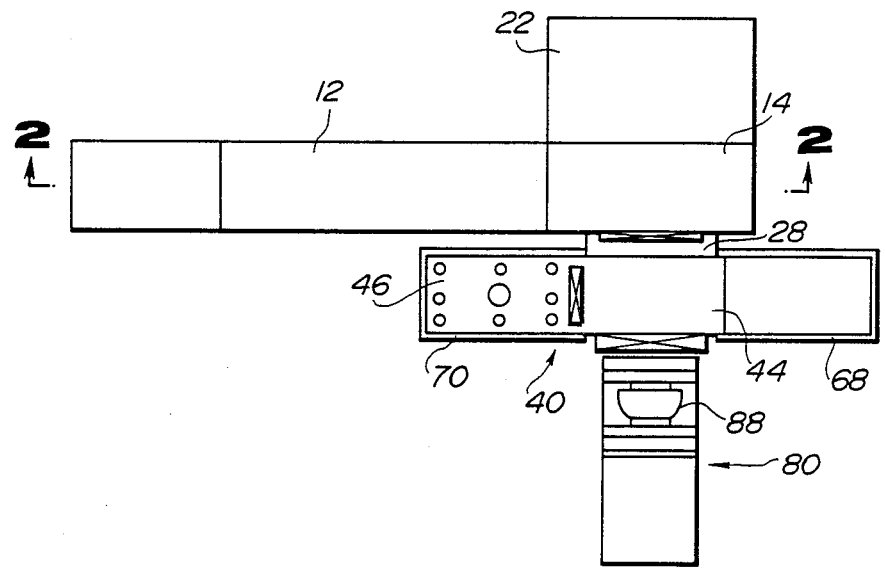
FIG. 1 shows, in a plan view, an outline of an apparatus according to the invention for bending and annealing glass sheets.
Figure 2:
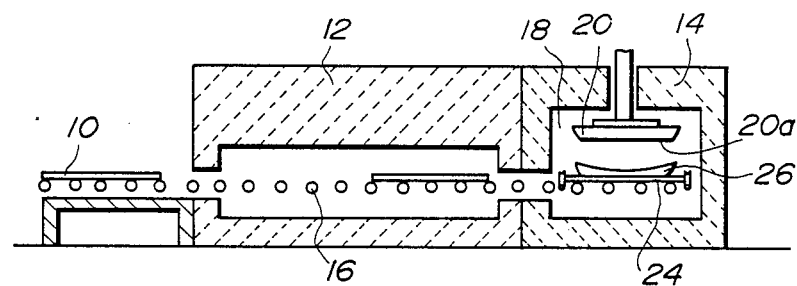
FIG. 2 is a sectional view taken along the line 2—2 in FIG. 1.

Referring to FIGS. 1 and 2, an apparatus embodying the invention includes a tunnel-type preheating furnace 12 and a shaping furnace 14 adjacent to the exit end of the furnace 12. The two furnaces 12 and 14 are provided with a roller conveyor 16 to transport a series of glass sheets 10 to be bent through the length of the preheating furnace 12 and into the shaping furnace 14. In an upper section of a shaping zone 18 in the furnace 14 there is a vacuum holder 20 which is movable downward and upward, and in a lower section beneath the conveyor rolls 16 the shaping zone 18 is provided with piping (not shown) to spout hot air vertically upward. The bottom surface 20a of the vacuum holder 20 is apertured (not illustrated) for suction, and this surface 20a serves as a glass sheet shaping surface. There is a first auxiliary furnace 22 adjacent to the shaping furnace 14 in the direction at a right angle with the preheating furnace 12. In the auxiliary furnace 22 maintained at a sufficiently high temperature, a dolly 24 mounted with a bending mold 26 stands by. The auxiliary furnace 22 communicates with the shaping zone 18 in the furnace 14, so that the dolly 24 can enter the shaping zone 18 and withdraw therefrom by moving along a path perpendicular to the path of the glass sheets 10 on the conveyor 16.

Figure 4:
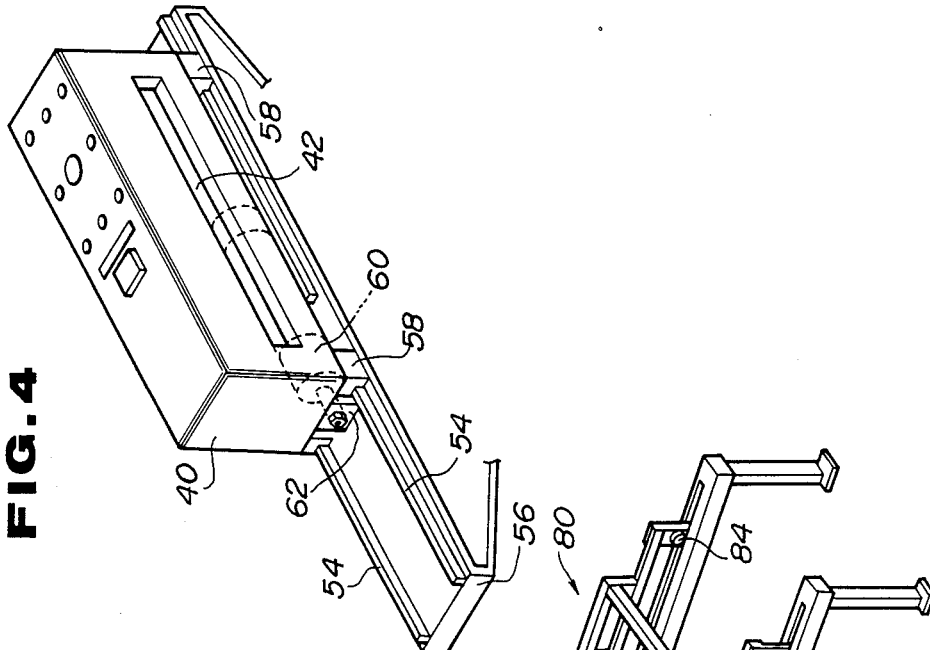
FIG. 4 is a perspective view of a frame on which an auxiliary furnace shown in FIG. 3 is movably mounted.
Figure 3:
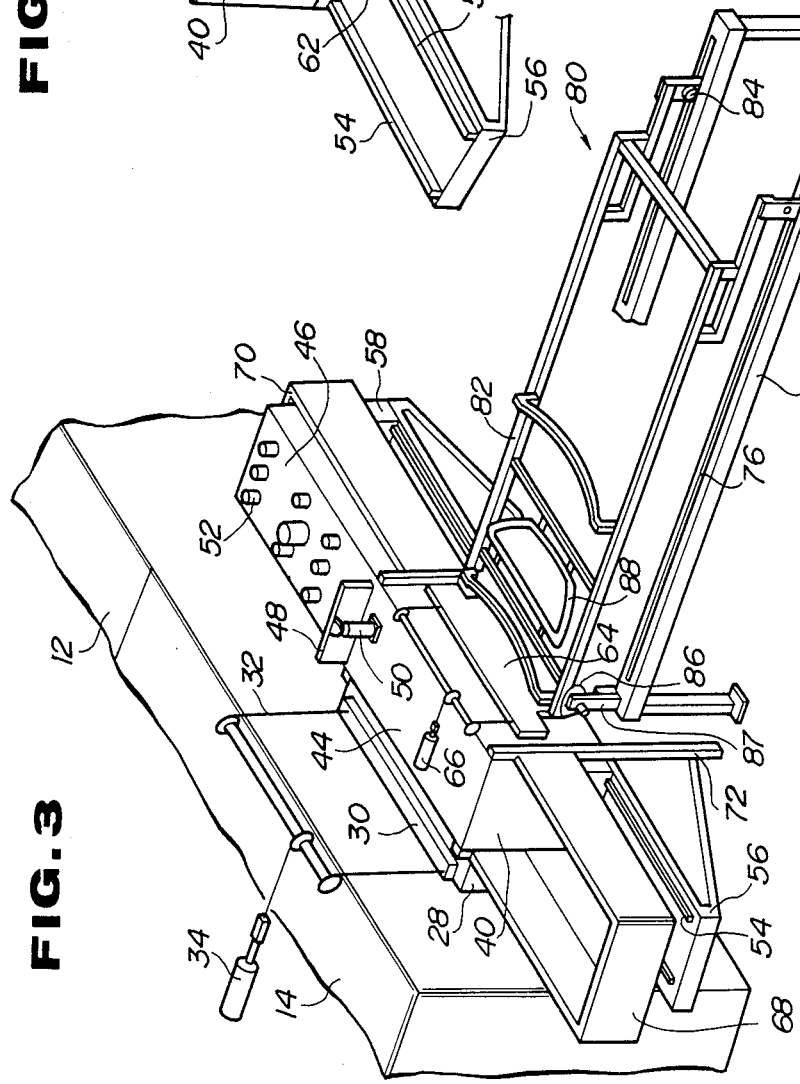
FIG. 3 is a perspective view, pertly cutaway and with some parts omitted, of the annealing heat treatment station in the apparatus of FIG. 1.

On the opposite side of the shaping furnace 14, with respect to the first auxiliary furnace 22, there is a second auxiliary furnace 40, and a sealing chamber 28 occupies a rarrow space between the shaping furnace 14 and the auxiliary furnace 40. Referring to FIG. 3, the sealing chamber 28 is provided with a damper 30 which is hung by wires 32 and can be moved upward and downward by actuating a pneumatic or hydraulic cylinder 34. When the damper 30 is pulled up the sealing chamber 28 communicates with the shaping zone 18 of the furnace 14. As can be seen in FIG. 4, the second auxiliary furnace 40 has a horizontally elongate slot-like opening 42 in each of the side wall adjacent to the sealing chamber 28 and the opposite side wall and, hence, communicates with the sealing chamber 28. By a damper 48 disposed at right angles with the aforementioned side walls, the second auxiliary furnace 40 is partitioned into a high-temperature section 44 and a low-temperature section 46. The damper 48 can be pulled up and lowered by actuating a pneumatic or hydraulic cylinder 50 mounted on the ceiling of the furnace 40. The both sections 44 and 46 of the furnace 40 are provided with electrical heaters (not shown). The high-temperature section 44 is maintained at a predetermined temperature in the range from 450° to 600° C. and the low-temperature section 46 at another predetermined temperature lower than 300° C. The ceiling of the low-temperature section 46 is studded with vent pipes 52 each provided with a damper.

As shown in FIG. 4, a pair of rails 54 are laid horizontally on a fixed frame 56 for supporting the second auxiliary furnace 40, and the furnace 40 is slidably mounted on the frame 56 by linear bearings 60 engaging the rails 54. To move the furnace 40 on the rails 54 a pneumatic or hydraulic cylinder 60 is mounted on the frame 56, and the piston rod of the cylinder 60 is connected to a bracket 62 fixed to an end wall of the furnace 40. The rails 54 extend parallel to the damper 30 in the sealing chamber 28, so that either of the high-temperature and low-temperature sections 44 and 46 of the auxiliary furnace 40 can be brought into the position opposite to the sealing chamber 28.

The openings 42 in the side walls of the auxiliary furnace 40 provide access to both the high-temperature section 44 and the low-temperature section 46. When, for example, the high-temperature section 44 is opposite to the sealing chamber 28 as illustrated in FIG. 3 the opening 42 in the side wall facing the sealing chamber 28 is partly closed by the damper 30, and the opening 42 in the opposite side wall is partly closed by a damper 64 which can be pulled up by the operation of a pneumatic or hydraulic cylinder 66 mounted on an unillustrated frame. To close the remaining portions of the openings 42 a heat insulating cover 70 is fixed to pillars 72. The cover 70 is constituted of two parallel side walls and an end wall transversal of the side walls and has inside measures conforming to the outside measures of the low-temperature section 46 of the furnace 40. Symmetrically another heat insulating cover 68 is fixed to pillars 72 to close the openings 42 in the high-temperature section 44 of the furnace 40 when the low-temperature section 46 is opposite to the sealing chamber 28.

In front of the damper 64, a pair of rails 76 are laid on a bed 78 to extend horizontally toward the damper 64 at right angles with the side walls of the auxiliary furnace 40. The bed 78 supports thereon a glass sheet receiving carriage 80. The main part of the carriage 80 is a frame 82 which has a pair of wheels 84 rolling on the rails 76 and is held horizontally by a pair of rollers 86 each of which is rotatably attached to a pillar 87 standing on the bed 76. A ring-like holder 88 is horizontally mounted on the frame 82 at its fore end section remote from the wheels 84. The ring-like holder 88 has a shape conforming to the curved glass sheets taken out of the shaping furnace 14 and can be detached from the frame 82 according to the need. When the damper 64 is pulled up the carriage 80 can be advanced along the rails 76 to introduce the ring-like holder 88 into the auxiliary furnace 40 through the opening 42. In that case an endmost portion of the frame 82 protrudes into the sealing chamber 28 and is supported by auxiliary rollers (not shown) disposed in the sealing chamber 28 in alignment with the rollers 86. When the damper 30 is pulled up the ring-like holder 88 can be introduced into the shaping zone 18 of the furnace 14 by further advancing the carriage 80. Means to reversibly drive the carriage 80 is not limited. For example, a chain driving mechanism (not shown) is used with a reversible motor placed at a location shielded from high temperatures of the furnaces.

Using the above described apparatus, glass sheets 10 are bent and annealed in the following way.

The preheating furnace 12 is for heating each glass sheet 10 conveyed therethrough to a temperature sufficient for bending, and in the shaping zone 18 of the shaping furnace 14 a suitable temperature such as 630°-670° C. is maintained. Initially the vacuum holder 20 is held in the descended position slightly above the roller conveyor 16. When a heated glass sheet 10 is brought into the shaping zone 18 vacuum is applied to the vacuum holder 20, and the glass sheet is lifted from the conveyor rolls 16 by the jets of hot air spouted from the piping in the lower section. As the result the glass sheet comes into contact with the vacuum holder 20 and is attracted thereto. Then the vacuum holder 20 is lifted, and the dolly 24 mounted with the bending mold 26 advances from the first auxiliary furnace 22 into the shaping furnace 14. As the dolly 24 stops in the predetermined position in the shaping zone 18 the vacuum holder 20 is lowered to press the glass sheet 10 against the bending mold 26 to thereby bend the glass sheet into a predetermined curved shape. After the bending operation the vacuum holder 20, which is holding the bent glass sheet, is lifted to allow the dolly 24 carrying thereon the mold 26 to withdraw from the shaping zone 18 into the auxiliary furnace 22.

Before starting the glass sheet bending operation the high-temperature section 44 of the second auxiliary furnace 40 is brought into the position opposite to the sealing chamber 28, and the ring-like holder 88 on the carriage 80 is introduced into the high-temperature section 44 of the auxiliary furnace 40. When the dolly 24 carrying thereon the mold 26 withdraws into the first auxiliary furnace 22 the dampers 30 and 64 are pulled up, and the carriage 80 is further advanced to introduce the ring-like holder 88 into the shaping zone 18 of the furnace 14. As the ring-like holder 88 stops in a predetermined position the vacuum is removed from the vacuum holder 20 to allow the curved glass sheet to drop onto the ring-like holder 88. Then the carriage 80 is retreated to withdraw the ring-like holder 88 into the high-temperature section 44 of the auxiliary furnace 40, and the dampers 30 and 64 are lowered.

A next glass sheet 10 is brought into the shaping zone 18 of the furnace 14 and bent by the above described operations of the vacuum holder 20 and the mold 26. While the bent glass sheet is held by the vacuum holder 20 the dolly 24 withdraws into the first auxiliary furnace 22. Then the dampers 30 and 64 are pulled up, and the carriage 80 is advanced to introduce the ring-like holder 88 on which the first curved glass sheet lies into the shaping zone 18. As the ring-like holder 88 stops in the predetermined position the vacuum holder 20 drops the second curved glass sheet onto the curved glass sheet lying on the ring-like holder 88.

Since the first curved glass sheet stayed in the high-temperature section 44 of the auxiliary furnace 40 maintained at a temperature lower than the temperature in the shaping zone 18 of the furnace 14, the placing of the second curved glass sheet on the first curved glass sheet does not result in deformation of the first curved glass sheet. On the other hand, the second curved glass sheet is still at the shaping temperature and hence can undergo deformation to cancel a slight, if any, difference in shape between the two glass sheets. Therefore the two curved glass sheets come into contact with each other over the entire area.

While the ring-like holder 88 is in the shaping zone 18 to receive the second curved glass sheet the damper 48 in the auxiliary furnace 40 is pulled up, and the cylinder 60 is actuated to slide the auxiliary furnace 40 on the rails 54 until the low-temperature section 46 comes adjacent to the sealing chamber 28. Then the damper 48 is lowered, and the carriage 80 is retreated to withdraw the ring-like holder 88 into the low-temperature section 46 of the furnace 40, and the dampers 30 and 64 are lowered. The temperature in the low-temperature section 46 gradually lowers as the hot air leaks away by the vent pipes 52. The ring-like holder 88 stays in the low-temperature section 46 until the temperature lowers to a predetermined level to accomplish annealing of the two curved glass sheets on the holder 88. During annealing of these glass sheets, another glass sheet is bent in the shaping zone 18 of the furnace 14.

In the above described process the actuations of the respective cylinders and the movement of the respective carriages are controlled by a control system using conventional sensors and sequencers.

The two curved glass sheets lying as a stack on the ring-like holder 88 have to be removed from the holder 88 and carried to a transport means such as a conveyor for transportation of the curved glass sheets to a next station. It is desirable to carry the two curved glass sheets together in the stacked state. In general it is possible to hoist and carry a stack of glass sheets by holding the stacked glass sheets at their two opposite edges by clamps suspended from trolleys or the like. However, when this method is applied to a stack of large-sized and curved glass sheets still at an elevated temperature there is a possibility of flection of the glass sheets. In this regard, the present invention includes a novel transfer mechanism for taking up the stack of curved glass sheets from the ring-like holder 88 in FIG. 3 and carry same to a conveyor or the like. A preferred embodiment of the transfer mechanism is shown in FIGS. 5-7.

The transfer mechanism comprises a lifter 100 shown in FIG. 5 and a carrier 110 shown in FIG. 6. The lifter 100 is arranged beneath the ring-like holder 88 mounted on the frame 82 in FIG. 3 and has a pneumatic or hydraulic cylinder 102 with a vertically movable piston rod 104. The speed of the upward or downward movement of the piston rod 104 is controllable. A plate 106 is horizontally fixed to the tip of the piston rod 104, and a plurality of pushing pins 108 stand on the plate 104 in such an arrangement that by upward motion of the piston rod 104 the pins 108 penetrate the ring-like holder 88 and push up the stack of the curved glass sheets (omitted from illustration) lying on the holder 88. The tip of each pin 108 is rounded.

The carrier 110 is suspended from trolleys 114 engaging a rail 112 which extends above and parallel to the frame 82 supporting the ring-like holder 88. A hanger plate 118 is fixed to the lower ends of the trolleys 114, and one of the trolleys 114 is provided with a reversible motor 120 having a speed reducer so that the hanger plate 118 can be moved along the rail 112 in either direction. A bar 122 extends downward from the hanger plate 118 and is fixed at its lower end to a gear box 124. An axle 126 of the gear box protrudes downward, and a motor 128 is mounted on the gear box 124 to turn the axle 126 via reduction gears in the gear box 124. A support member 130 is fixed to the lower end of the axle 126. A plate 132 roughly in the shape of a sector is detachably fixed in its apex region to the support member 130 by bolts 134 such that the major portion of the plate 132 suspends from the support member 130. The plate 132 is a curved plate as can be seen in FIG. 7. A plurality of rods 136 extend horizontally from the concave surface of the curved plate 132. These rods 136 are spaced from each other and fixed to the plate 132 in its lower marginal region along the arcuate edge, and these rods 136 are at different vertical distances from a given horizontal plane such that the rods 136 are contained in a curved plane which is approximately conforming to the curvature of the curved glass sheets on the ring-like holder 88. Together with the supporting plate 132 the rods 136 are horizontally swivelled by operating the motor 128. A bracket 138 fixed to both the bar 122 and the gear box 124 protrudes horizontally at normal angles with the rail 112. An auxiliary rail 140 extends parallel to the rail 112, and a pair of rollers 142 provided at the protruding end of the bracket 138 engage the auxiliary rail 140.

The operation of this transfer mechanism is as follows.

When the ring-like holder 88 supporting thereon the stack of two curved glass sheets is brought to a halt in the position above the lifter 100, the cylinder 102 of the lifter is actuated to force the pins 108 to push up the glass sheets until a clearance sufficient for insertion of the rods 136 of the carrier 110 is produced between the holder 88 and the lower glass sheet. Then the piston rod 104 of the cylinder 102 is stopped, and the motor 120 is operated to move the carrier 110 toward the position of the lifted glass sheets while the rods 136 are pointed at the clearance between the holder 88 and the glass sheets. As the rods 136 penetrate the clearance the motor 120 is stopped to keep the rods 136 in that position. Then the cylinder 102 is actuated to draw down the plate 106 on which the pins 108 stand to thereby allow the stack of the curved glass sheets to rest on the rods 136 of the carrier 110. Immediately the motor 120 is reversely operated to move the carrier 100 supporting the glass sheets toward the predetermined station. During this movement the motor 128 is operated to slowly turn the axle 126 by 180° to thereby change the direction of the rods 136. For example, as shown in FIG. 7 the carrier 110 comes to a halt in a predetermined position in front of the upstream end of a peg conveyor 146, and a rotating peg 148 of the conveyor 146 receives the glass sheets (omitted from illustration) carried by the rods 136. Then the motor 128 is operated to turn the carrier 110 by 180°, and the motor 120 is reversely operated to return the carrier 110 to the initial position. In the above process the operations of the cylinder 102 and the motors 120 and 128 are controlled by using suitable sensors and sequencers.

In the transfer mechanism of FIGS. 5-7 the auxiliary rail 140 and the bracket 138 provided with the rollers 142 serve the purpose of preventing rolling and pitching of the suspended carrier 110 during its movement along the rail 112. For the same purpose it is effective to arrange the trolleys 114 with a fairly wide span. The curved and sectorial shape of the plate 132 is effective for balancing the plate 132 against the projecting rods 136. Since the rods 136 are arranged in a suitably curved plane the curved glass sheets are held stably without flection during transfer. It is easy to exchange the plate 132 for another plate provided with differently arranged rods (136) according to the curvature of the glass sheets to be carried. According to the need the rails 112 and 140 may be gently curved. The spacings between the parallel rods 136 are arbitrary on condition that none of the rods come into contact with the pins 108 of the lifter 100 or the peg 148 of the conveyor 146. It is preferable to cover each rod 136 with, for example, a heat resistant ceramic cloth to further lessen the possibility of damaging or staining the glass sheets.

What is claimed is:

1. A method of consecutively and similarly bending at least two glass sheets to be united into a curved laminated glass member and annealing the curved glass sheets obtained by bending, the method comprising the steps of:
    (a) heating a first glass sheet to a shaping temperature suitable for bending of the glass sheet;
    (b) in a shaping zone of a furnace bending the heated first glass sheet into a first curved glass sheet and holding the first curved glass sheet generally horizontally in a lifted position;
    (c) bringing a ring-like holder into said shaping zone and laying the first curved glass sheet on said holder;
    (d) transferring said holder with the first curved glass sheet laid thereon from said shaping zone into a high-temperature section of an auxiliary furnace which is located adjacent to said furnace, said high-temperature section being maintained at a predetermined temperature close to said shaping temperature;
    (e) heating a second glass sheet to said shaping temperature;

(f) in said shaping zone bending the heated second glass sheet into a second curved glass sheet while the first curved glass sheet on said holder is kept in said high-temperature section of said auxiliary furnace and holding the second curved glass sheet generally horizontally in a lifted position;

(g) bringing said holder with the first curved glass sheet laid thereon into said shaping zone and laying the second curved glass sheet on the first curved glass sheet lying on said holder; and (h) transferring said holder on which the curved glass sheets to be united into said laminated glass member are lying from said shaping zone into a low-temperature section of said auxilary furnace; and (i) annealing the curved glass sheets lying on said holder in said low-temperature section.

2. A method according to claim 1, further comprising moving said auxiliary furnace such that said high-temperature section is in a position adjacent to said shaping zone of said furnace at the start of the step (d) and such that said said low-temperature section is in said position at the start of the step (h).

3. A method according to claim 1, wherein the bending of the heated glass sheet in each of the steps (b) and (f) comprises holding the heated glass sheet in contact with an apertured shaping surface of a vacuum holder, bringing a bending mold into a position beneath said vacuum holder, lowering said vacuum holder thereby pressing the heated glass sheet against said mold, lifting said vacuum holder while holding the curved glass sheet in contact with said shaping surface and transferring said mold from said position to a waiting chamber maintained at a high temperature.

4. A method according to claim 1, wherein said step (i) is performed while the step (b) of a next cycle of the steps (a) to (i) for bending and annealing another set of glass sheets is performed.

5. An apparatus for bending glass sheets to be united into a curved and laminated glass member and annealing the curved glass sheets obtained by bending, the apparatus comprising:
a furnace comprising a shaping zone;
shaping means for bending each of said glass sheets into a curved glass sheet and holding the curved glass sheet generally horizontally in a lifted position in said shaping zone;
an auxiliary furnace which is disposed adjacent to said furnace and is partitioned into a high-temperature section where a predetermined temperature close to the temperature in said shaping zone of said furnace can be maintained and a low-temperature section for annealing the curved glass sheet;
a shift means for moving said auxiliary furnace such that either of said high-temperature section and said low-temperature section can be brought to a position adjacent to said shaping zone of said furnace at a desired time;
a ring-like holder which is shaped such that the curved glass sheet can be laid thereon generally horizontally;
a movable frame supporting thereon said ring-like holder horizontally; and
carriage means for horizontally and linearly moving said frame so as to introduce said holder into said auxiliary furnace and further into said shaping zone of said furnace and withdraw said holder from said shaping zone into said auxiliary furnace and then from said auxiliary furnace.

6. An apparatus according to claim 5, wherein said high-temperature and low-temperature sections of said auxiliary furnace are aligned such that an axis common to said high-temperature and low-temperature sections is parallel to an exit of said shaping zone of said furnace, said shift means moving said auxiliary furnace in the directions of said axis.

7. An apparatus according to claim 6, wherein said shift means comprises rails laid parallel to said axis and means for mounting said auxiliary furnace on said rails and moving said auxiliary furnace on said rails in either direction.

8. An apparatus according to claim 5, further comprising control means for controlling said shift means and said carriage means such that said ring-like holder is first introduced into and kept in said high-temperature section of said auxiliary furnace, then advanced into said shaping zone of said furnace to receive thereon a curved glass sheet, then withdrawn into and kept in said high-temperature zone, then advanced into said shaping zone to receive another curved glass sheet on said curved glass sheet, then moved into and kept in said low-temperature section of said auxiliary furnace to anneal the curved glass sheets lying on the holder.

9. An apparatus according to claim 5, wherein said shaping means comprises a vacuum holder which is vertically movably disposed in an upper section of said shaping zone and has an apertured shaping surface as a bottom surface, a bending mold and means for carrying said mold into a lower section of said shaping zone while said vacuum holder is in a lifted position with a glass sheet in contact with said shaping surface and withdrawing said mold from said shaping zone after bending the glass sheet into a curved glass sheet by lowering said vacuum holder toward said mold and while said vacuum holder is in a lifted position with the curved glass sheet in contact with said shaping surface.

10. An apparatus according to claim 5, further comprising a transfer system for transferring the annealed curved glass sheets lying on said ring-like holder to another station, the transfer system comprising a lift mechanism which is disposed outside said auxiliary furnace and has a plurality of vertically projecting pins to push up the curved glass sheets lying as a stack on said ring-like holder mounted on said frame so as to produce a clearance between said holder and the lowermost curved glass sheet, and a carrier mechanism which is suspended from trolleys movable on a rail and comprises a base member, a plurality of rods which are spaced from and parallel to each other and project horizontally from said base member at different vertical distances from a given horizontal plane such that the rods are contained in a curved plane which is approximately conforming to the curvature of the curved glass sheets, and means for horizontally swivelling said base member together with said rods, the carrier mechanism being arranged such that said rods can be inserted into said clearance to hold the stack of the curved glass sheets thereon.

11. An apparatus according to claim 10, wherein said base member of said carrier mechanism is a plate roughly in the shape of a sector supported in its apex region with its arcuate edge as the lower edge, said rods projecting from a lower marginal region of said plate along the arcuate edge.

12. An apparatus according to claim 11, wherein said plate is curved such that said rods project from a concave surface of said plate.

* * * * *